United States Patent [19]

Tessmer et al.

[11] Patent Number: 5,472,998
[45] Date of Patent: Dec. 5, 1995

[54] POLYMERIC ADDITIVE FOR CATHODIC ELECTROCOATING COMPOSITIONS FOR IMPROVED THROW POWER

[75] Inventors: Robert A. Tessmer, Roseville; Peter W. Uhlianuk, Romeo; Ding Y. Chung, Rochester Hills, all of Mich.

[73] Assignee: E. I. Du Pont de Nemours and Company, Wilmington, Del.

[21] Appl. No.: 306,424

[22] Filed: Sep. 16, 1994

[51] Int. Cl.$^6$ .............................. C08K 3/20; C08L 63/02
[52] U.S. Cl. ................. 523/404; 204/181.4; 204/181.7; 528/119
[58] Field of Search .................... 523/404; 528/119; 204/181.4, 181.7

[56] References Cited

U.S. PATENT DOCUMENTS

| | | | |
|---|---|---|---|
| 3,922,253 | 11/1975 | Jerabek et al. | 260/77.5 TB |
| 3,952,023 | 4/1976 | Kaiya et al. | 260/346.8 R |
| 4,137,140 | 1/1979 | Belanger | 204/181 C |
| 4,145,501 | 3/1979 | Kaiya et al. | 526/217 |
| 4,148,772 | 4/1979 | Marchetti et al. | 260/29.2 EP |
| 4,241,101 | 12/1980 | Saunders et al. | 427/32 |
| 4,256,621 | 3/1981 | Shimokai et al. | 260/29.7 NR |
| 4,302,524 | 11/1981 | Mandella et al. | 430/155 |
| 4,419,467 | 12/1983 | Wismer et al. | 523/414 |
| 4,468,307 | 8/1984 | Wismer et al. | 204/181 C |
| 4,474,929 | 10/1984 | Schrader | 525/482 |
| 4,722,990 | 2/1988 | Koenig et al. | 528/95 |
| 4,795,791 | 1/1989 | Koenig et al. | 525/523 |
| 5,070,149 | 12/1991 | Debroy et al. | 525/296 |
| 5,089,542 | 2/1992 | Nishida et al. | 523/410 |
| 5,128,393 | 4/1992 | Peng et al. | 523/402 |
| 5,147,906 | 9/1992 | Nishida et al. | 523/410 |
| 5,158,995 | 10/1992 | Nishida et al. | 523/410 |
| 5,371,120 | 12/1994 | Uhlianuk | 523/414 |

FOREIGN PATENT DOCUMENTS

| | | |
|---|---|---|
| 2001700 | 5/1990 | Canada . |
| 210918 | 6/1984 | Germany . |
| 58-125760 | 7/1983 | Japan . |
| 58-179272 | 10/1983 | Japan . |
| 59-011369 | 1/1984 | Japan . |
| 62-246931 | 10/1987 | Japan . |
| 63-22073 | 9/1988 | Japan . |
| 2055843 | 3/1981 | United Kingdom . |

*Primary Examiner*—Melvyn I. Marquis
*Assistant Examiner*—D. Aylward
*Attorney, Agent, or Firm*—Hilmar L. Fricke

[57] ABSTRACT

An improved aqueous cathodic electrocoating composition having a binder of an epoxy-amine adduct which is of an epoxy resin that has been reacted with an amine, and a blocked polyisocyanate crosslinking agent; wherein the improvement is the use of a water soluble electrically conductive polymeric additive of a polyepoxy hydroxy ether resin reacted with a ketimine and optionally up to 60% of the epoxy end groups of the resin reacted with another amine and the resin has an epoxy equivalent weight of about 500–900, a weight average molecular weight of about 1,000–5,000 and an electrical conductivity of about 4,000–8,000 microsiemens to provide an electrocoating composition having improved throw power.

8 Claims, No Drawings

POLYMERIC ADDITIVE FOR CATHODIC ELECTROCOATING COMPOSITIONS FOR IMPROVED THROW POWER

BACKGROUND OF THE INVENTION

This invention is directed to a cathodic electrocoating composition and in particular to a cathodic electrocoating composition containing a polymeric additive which improves throw power.

The coating of electrically conductive substrates by an electrodeposition process also called an electrocoating process is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. 4,137,140 issued Jan. 30, 1979 and Wismer et al U.S. 4,468,307 issued Aug. 25, 1984.

Throw power of electrocoating compositions continues to be a problem. Throw power is the degree to which an electrodeposited film penetrates and coats the surfaces of recessed interior areas of an automobile or truck body. Electrodeposition of coatings follows the force lines of the electrical field that exists in an electrocoating bath between the cathode and the anode. These force lines diminish as they penetrate into the recessed areas of the auto or truck body and cease to exist when the recessed area is too deep and a coating will not be deposited into such an area.

As automobile and truck body designs change, there is a need for electrocoating compositions that have increased throw power and that will penetrate and coat recessed areas. The improved composition of this invention has increased throwing power along with other desirable characteristics of solvent, corrosion and chip resistance.

SUMMARY OF THE INVENTION

An improved aqueous cathodic electrocoating composition having a binder of an epoxy-amine adduct which is of an epoxy resin that has been reacted with an amine, and a blocked polyisocyanate crosslinking agent; wherein the improvement is the use of a water soluble electrically conductive polymeric additive of a polyepoxy hydroxy ether resin reacted with a ketimine, the resin has an epoxy equivalent weight of about 500–900, a weight average molecular weight of about 1,000–5,000 and an electrical conductivity of about 4,000–8,000 microsiemens to provide an electrocoating composition having improved throw power.

DETAILED DESCRIPTION OF THE INVENTION

The polymeric additive of this invention when added to a conventional electrocoating composition improves the throw power of the composition. The polymeric additive does not adversely affect other properties of the electrocoating composition such as its overall corrosion protection. The polymeric additive can be added directly to an electrocoating tank containing an epoxy based electrocoating composition and need not be formulated with the composition. The polymeric additive is blended with the electrocoating composition in amounts of about 3–20% by weight, based on the weight of the binder in the electrocoating bath; preferably about 9–12% by weight of the additive is used.

The polymeric additive is prepared by reacting a polyepoxy hydroxy ether resin with a ketimine preferably at least 40% of the epoxy end groups of the resin are reacted with ketimine and up to 60% of the epoxy end groups are reacted with another amine which may be either a primary amine, secondary amine or any mixtures thereof. Generally, reaction temperatures of about 100°–130° C. are used and the constituents are reacted for about 1–3 hours. The polymeric additive is added to an aqueous acid solution and the ketimine reacts with water to form an amine which is neutralized by the acid along with any other amine present to form an aqueous solution of the polymeric additive.

The polymeric additive has an epoxy equivalent weight of about 500–900, a weight average molecular weight of about 1,000–5,000 determined by gel permeation chromatography using polystyrene as the standard and an electrical conductivity of about 4,000–8,000 microsiemens determined with a conductivity meter.

Epoxy equivalent weight is the weight of resin in grams which contains one gram equivalent of epoxy.

The poly epoxy hydroxy ether resin used to form the polymeric additive can be any epoxy hydroxy containing polymer having a 1,2 epoxy equivalency of two or more epoxy groups per molecule. The preferred are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol)ethane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-bis(hydroxymethyl)cyclohexane, 1,3-bis-(hydroxymethyl-)cyclohexane, 1,2 cyclohexane diol, 1,4 cyclohexane diol and hydrogenated bisphenol A.

The polyepoxy hydroxy ether resins have molecular weights of at least 150 and preferably within the range of 200 to 3000.

The polyepoxides hydroxy ether resins can be chain extended with any of the aforementioned polyhydric phenols, the preferred being bisphenol A, polyether or a polyester polyols which enhances flow and coalescence. Typical useful polyol chain extenders are polycaprolactone diols such as Tone® series available from Union Carbide Corporation, polyoxypropylene diamine such as Jeffamine D-2000® having a molecular o weight of about 2000 available from Texaco Chemical Company and ethyoxylated Bisphenol A such as SYNFAC 8009® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

Typical catalysts that are used in the formation of these polyepoxy hydroxy ether resins are tertiary amines such as dimethyl benzyl amine and organometallic complex's such as triphenyl phosphonium iodide.

Ketimines useful in this invention are prepared from ketones and primary amines. The water formed is removed, for example, by azeotropic distillation. Useful ketones include dialkyl, diaryl and alkylaryl ketones having 3–13 carbons atoms. Specific examples include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylene diamine, 1,3-diamopropane, 1,4-diaminobutane, 1,6-diaminohexane, 4,9-dioxadodecone, 1,12-diamine and the like. One typically useful ketimine is diketimine which is the ketimine of diethylene triamine and methyl isobutyl ketone.

Typically useful primary and secondary amines are diethyl amine, methyl ethyl amine, methyl ethanol amine, ethyl ethanol amine, mono ethanol amine, ethyl amine, dimethyl amine, diethyl amine, propyl amine, dipropyl amine, isopropyl amine, diisopropyl amine, butyl amine, dibutyl amine and the like. Alkanol amines such as methyl ethanol amine are preferred.

Typical acids used to neutralize the polymeric additive to form water solution are lactic acid, acetic acid, formic acid, sulfamic acid and the like.

The film forming binder of the principal emulsion used to form the cathodic electrocoating composition is an epoxy amine adduct and a blocked polyisocyanate crosslinking agent and is dispersed in an aqueous medium and the binder is present in amounts of about 30–50% by weight of solids. The epoxy amine adduct is formed of an epoxy resin which preferably is chain extended and then reacted with an amine. Typical aqueous cationic electrocoating compositions are shown in DebRoy et al U.S. Pat. No. 5,070,149 issued Dec. 3, 1991 and the aforementioned U.S. Pat. Nos. 3,922,253, 4,419,467, 4,137,140 and 4,468,307.

Preferred polyisocyanate crosslinking agents that are used are well known in the prior art. These are aliphatic, cycloaliphatic and aromatic isocyanates such as hexamethylene diisocyanate, cyclohexamethylene diisocyanate, toluene diisocyanate, methylene diphenyl diisocyanate and the like. These isocyanates are pre-reacted with a blocking agent such as oximes, alcohols, or caprolactams which block the isocyanate functionality, i.e., the crosslinking functionality. One preferred mixture of blocking agents is methanol, ethanol and diethylene glycol monobutyl ether. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The binder of the electrocoating composition typically contains about 40–60% by weight of the epoxy amine adduct and 60–40% of the blocked isocyanate and are the principal resinous ingredients in the electrocoating composition.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used or the anticrater agent of this invention can be used. After grinding, the particle size of the pigment should be as small as practical, generally, the particle size is about 6–8 using a Hegman grinding gauge.

Pigments which can be used in this invention include titanium dioxide, basic lead silicate, strontium chromate, carbon black, iron oxide, zinc hydroxy phosphite, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have been found to adversely affect coalescence and flow.

The electrocoating composition of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of the binder of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight of the binder of the composition.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

The following example illustrates the invention. All parts and percentages are on a weight basis unless otherwise indicated.

EXAMPLE

Preparation of Polymeric Additive

The following ingredients were charged into a suitable reaction vessel equipped with a stirrer and a heating source:

|  | Parts by Weight |
|---|---|
| Portion 1 | |
| Epon 828 ® (diglycidyl ether of bisphenol A having an epoxy equivalent weight of 188) | 1494.22 |
| Bisphenol A | 600.00 |
| Triphenyl phosphonium iodide | 1.50 |
| Portion 2 | |
| Methyl isobutyl ketone | 725.25 |
| Portion 3 | |
| Diketimine (reaction product of 2 moles of methyl isobutyl ketone 1 mole of diethylene triamine having weight average molecular weight of 375) | 611.25 |
| Methylethanol amine | 80.07 |
| Portion 4 | |
| Lactic acid | 235.03 |
| Deionized water | 409.00 |
| Total | 4156.32 |

Portion 1 was charged into the reactor and heated under nitrogen with constant stirring to about 146° C. and held at 160° C. for about 1 hour after the peak of the exothermic reaction. Portion 2 was added and the epoxy equivalent weight of the resin was increased to 778 and the reaction mixture was allowed to cool to 105° C. Portion 3 was added and the resulting exothermic reaction increased the temperature to 120° C. and the reaction mixture was held at this temperature for about 1 hour. Portion 4 was charged into a separate vessel and mixed and then the reaction mixture was added to mixed Portion 4 under constant agitation and held with constant mixing for about 10 hours to allow the methyl isobutyl ketone to evaporate. The resulting additive dispersion had the following properties:

36%—non-volatile content pH—8.2 conductivity—6630 microsiemens 0.101 microns particle size.

weight average molecular weight—1680

Particle size was measured with a Coulter Model LS150 Automated Laser Based Particle Size Analyzer made by Coulter Scientific Instruments.

Conductivity was measured with a YSI Model 35 Conductivity Meter made by Yellow Springs Instrument Co., Inc., Yellow Springs, Ohio.

Molecular weight was measured by gel chromatography using polystyrene as the standard.

An electrocoating composition was prepared according to Example 1 of DebRoy et al U.S. Pat. No. 5,070,149 issued Dec. 3, 1991. The following electrocoating baths 1–4 were formulated with the above polymeric additive and the throw power of each of the electrocoating baths was measured. Throw power was determined according to Ford Laboratory Test Method MJ BI 20-2C wherein the distance the coating deposits on the inside of a box formed by panels of 12×4 inches was measured. The following are the throw power results for each of the baths:

| Electrocoating Bath | % Polymeric Additive | Throw Power-Distance - mm |
|---|---|---|
| 1 | 0 | 186 |
| 2 | 3 | 191 |
| 3 | 6 | 207 |
| 4 | 9 | 210 |

The throw power for bath 1 which did not contain the polymeric additive was lower than the throw power for baths 2–4 which contained from 3–9% by weight respectively of the polymeric additive. Throw power was increased proportionately to the amount of polymeric additive present in the bath.

We claim:

1. An improved aqueous cathodic electrocoating composition comprising a binder of an epoxy-amine adduct of an epoxy resin that has been reacted with an amine, and a blocked polyisocyanate crosslinking agent; wherein the improvement consists essentially of a water soluble electrically conductive polymeric additive consisting essentially of a polyepoxy hydroxy ether resin reacted with a ketimine and this additive has an epoxy equivalent weight of about 500–900, a weight average molecular weight of about 1,000–5,000 and an electrical conductivity of about 4,000–8,000 microsiemens to provide an electrocoating composition having improved throw power and wherein the polymeric additive is neutralized with an acid to form a water soluble additive.

2. The improved cathodic electrocoating composition of claim 1 in which the additive is the diglycidyl ether of a polyhydric phenol having at least 40% of the glycidyl end groups reacted with ketimine and up to 60% of the glycidyl end groups reacted with another amine.

3. The improved cathodic electrocoating composition of claim 1 which contains about 3–20% by weight, based on the weight of the binder, of the polymeric additive.

4. The improved cathodic electrocoating composition of claim 1 in which the polyepoxy hydroxy ether resin is extended with a dihydric phenol.

5. The improved cathodic electrocoating composition of claim 1 in which the polyepoxy hydroxy ether resin is extended with an ethoxylated dihydric phenol.

6. The improved cathodic electrocoating composition of claim 1 in which the polyepoxy hydroxy ether resin is extended with a polyether polyol or a polyester polyol.

7. The improved cathodic electrocoating composition of claim 1 in which the polyepoxy hydroxy ether resin is extended with polyoxypropylene diamine.

8. The improved electrocoating composition of claim 2 in which the ketimine is diketimine and the amine is alkanol amine.

* * * * *